(12) United States Patent
Hashimoto

(10) Patent No.: US 12,032,372 B2
(45) Date of Patent: *Jul. 9, 2024

(54) AUTONOMOUS DRIVING SYSTEM

(71) Applicant: TOYOTA JIDOSHA KABUSHIKI KAISHA, Toyota (JP)

(72) Inventor: Ryuta Hashimoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,420

(22) Filed: Dec. 8, 2022

(65) Prior Publication Data
US 2023/0111387 A1 Apr. 13, 2023

Related U.S. Application Data

(63) Continuation of application No. 17/564,957, filed on Dec. 29, 2021, now Pat. No. 11,797,002, which is a continuation of application No. 17/003,367, filed on Aug. 26, 2020, now Pat. No. 11,449,053, which is a
(Continued)

(30) Foreign Application Priority Data

Oct. 10, 2017 (JP) .................. 2017-197031

(51) Int. Cl.
*G05D 1/00* (2024.01)
*B60K 35/28* (2024.01)
(Continued)

(52) U.S. Cl.
CPC ........... *G05D 1/0061* (2013.01); *B60W 50/14* (2013.01); *G05D 1/0088* (2013.01); *B60K 35/28* (2024.01);
(Continued)

(58) Field of Classification Search
CPC ...... G05D 1/00; G05D 1/0061; G05D 1/0088; B60W 50/14; B60W 2540/215;
(Continued)

(56) References Cited

U.S. PATENT DOCUMENTS 8,108,092 B2 1/2012 Phillips et al.
9,940,834 B1 4/2018 Konrardy
(Continued)

FOREIGN PATENT DOCUMENTS

AU 2021105935 A4 12/2021
CA 2 847 234 A1 3/2013
(Continued)

OTHER PUBLICATIONS

Notice of Allowance dated Jul. 18, 2023 in U.S. Appl. No. 17/564,957.
(Continued)

*Primary Examiner* — Atul Trivedi
(74) *Attorney, Agent, or Firm* — Sughrue Mion, PLLC

(57) ABSTRACT

An autonomous driving system includes: a Human Machine Interface; and a control device configured to control autonomous driving of a vehicle, present a first operation instruction to a driver of the vehicle during the autonomous driving, the first operation instruction requesting the driver to perform a first response operation performed in response to a first request or a first proposal by presenting the first request or the first proposal to the driver via the Human Machine Interface, and prohibit presenting a second operation instruction different from the first operation instruction until the first response operation is completed or until a timing at which the first response operation is predicted to be completed, the second operation instruction requesting the driver to perform a second response operation performed in response to a second request or a second proposal by presenting the second request or the second proposal.

15 Claims, 9 Drawing Sheets

Related U.S. Application Data continuation of application No. 16/131,293, filed on Sep. 14, 2018, now Pat. No. 10,788,825.

(51) Int. Cl.
*B60K 35/29* (2024.01)
*B60W 50/00* (2006.01)
*B60W 50/14* (2020.01)

(52) U.S. Cl.
CPC ........ *B60K 35/29* (2024.01); *B60K 2360/175* (2024.01); *B60K 2360/186* (2024.01); *B60W 2050/0072* (2013.01); *B60W 2050/0091* (2013.01); *B60W 2540/215* (2020.02)

(58) Field of Classification Search
CPC .. B60W 2050/0072; B60W 2050/0091; B60K 2370/175; B60K 2370/186
USPC ........................................................ 701/23
See application file for complete search history.

(56) References Cited

U.S. PATENT DOCUMENTS

| | | |
|---|---|---|
| 10,134,278 B1 | 11/2018 | Konrardy |
| 10,788,825 B2 | 9/2020 | Hashimoto |
| 11,449,053 B2 | 9/2022 | Hashimoto |
| 2008/0161986 A1 | 7/2008 | Breed |
| 2008/0161987 A1 | 7/2008 | Breed |
| 2012/0071151 A1 | 3/2012 | Abramson et al. |
| 2012/0089291 A1 | 4/2012 | Halder et al. |
| 2012/0089293 A1 | 4/2012 | Halder et al. |
| 2014/0207325 A1 | 7/2014 | Mudalige et al. |
| 2014/0309814 A1 | 10/2014 | Ricci et al. |
| 2015/0053066 A1 | 2/2015 | Hampiholi et al. |
| 2015/0066282 A1 | 3/2015 | Yopp |
| 2015/0158469 A1 | 6/2015 | Cheatham, III et al. |
| 2015/0168174 A1 | 6/2015 | Abramson et al. |
| 2015/0251666 A1 | 9/2015 | Attard et al. |
| 2016/0068103 A1 | 3/2016 | McNew et al. |
| 2016/0071418 A1 | 3/2016 | Oshida et al. |
| 2016/0139594 A1 | 5/2016 | Okumura et al. |
| 2016/0152336 A1* | 6/2016 | Lampazzi ............ G05D 1/0038 701/36 |
| 2016/0167653 A1 | 6/2016 | Malone et al. |
| 2016/0176397 A1 | 6/2016 | Prokhorov et al. |
| 2016/0176398 A1 | 6/2016 | Prokhorov et al. |
| 2016/0185351 A1* | 6/2016 | Jerger ................ F16H 61/0204 701/56 |
| 2016/0205238 A1 | 7/2016 | Abramson et al. |
| 2016/0221500 A1 | 8/2016 | Sakai et al. |
| 2016/0252903 A1 | 9/2016 | Prokhorov |
| 2016/0362116 A1 | 12/2016 | Otsuka |
| 2016/0368492 A1* | 12/2016 | Al-Stouhi ............. B60W 30/09 |
| 2016/0371987 A1 | 12/2016 | Kotecha |
| 2016/0379310 A1 | 12/2016 | Madigan et al. |
| 2017/0015331 A1 | 1/2017 | Laur et al. |
| 2017/0024022 A1* | 1/2017 | Upmanue ............... G06F 3/038 |
| 2017/0043768 A1 | 2/2017 | Prokhorov |
| 2017/0090480 A1 | 3/2017 | Ho et al. |
| 2017/0106876 A1 | 4/2017 | Gordon et al. |
| 2017/0110011 A1* | 4/2017 | Tonguz ................. G08G 1/087 |
| 2017/0123434 A1 | 5/2017 | Urano et al. |
| 2017/0147137 A1* | 5/2017 | Schunder ............ G06F 3/04883 |
| 2017/0158191 A1 | 6/2017 | Bills et al. |
| 2017/0192437 A1 | 7/2017 | Bier et al. |
| 2017/0193828 A1* | 7/2017 | Holtzman ............ G05D 1/0094 |
| 2017/0217445 A1* | 8/2017 | Tzirkel-Hancock ......................... B60W 50/08 |
| 2017/0235305 A1 | 8/2017 | Jung et al. |
| 2017/0279957 A1 | 9/2017 | Abramson et al. |
| 2017/0315551 A1* | 11/2017 | Mimura ................ G05D 1/021 |
| 2017/0349183 A1* | 12/2017 | Sen ...................... B60W 10/20 |
| 2017/0349185 A1* | 12/2017 | McNew .................. G05B 9/02 |
| 2017/0357400 A1 | 12/2017 | Foster et al. |
| 2017/0361853 A1 | 12/2017 | Nagy et al. |
| 2018/0164808 A1 | 6/2018 | Prokhorov |
| 2018/0173231 A1 | 6/2018 | Takae et al. |
| 2018/0178801 A1 | 6/2018 | Hashimoto et al. |
| 2018/0356814 A1 | 12/2018 | Brooks |
| 2019/0079509 A1 | 3/2019 | Bosworth |
| 2019/0107835 A1 | 4/2019 | Hashimoto |
| 2019/0111925 A1 | 4/2019 | Sata |
| 2019/0186945 A1* | 6/2019 | Choi ...................... G06V 20/56 |
| 2019/0186947 A1* | 6/2019 | Rockmore ......... G01C 21/3629 |
| 2019/0193734 A1* | 6/2019 | Ekl ................... G01C 21/3407 |
| 2019/0248382 A1 | 8/2019 | Hashimoto et al. |
| 2019/0268743 A1* | 8/2019 | Cho ........................ B60Q 1/545 |
| 2020/0001890 A1 | 1/2020 | Kline et al. |
| 2020/0023839 A1 | 1/2020 | Yan |
| 2020/0079379 A1 | 3/2020 | Mimura |
| 2020/0089241 A1* | 3/2020 | Kao ....................... G05D 1/0217 |
| 2020/0090322 A1 | 3/2020 | Seo et al. |
| 2020/0094875 A1* | 3/2020 | Mimura ................ B60K 35/00 |
| 2020/0233940 A1* | 7/2020 | Edwards ............... H04L 9/0637 |
| 2020/0255028 A1* | 8/2020 | Raichelgauz ..... B60W 60/0013 |
| 2020/0307594 A1 | 10/2020 | Kato et al. |
| 2020/0356339 A1 | 11/2020 | Krishnan et al. |
| 2020/0393830 A1 | 12/2020 | Hashimoto |
| 2021/0009126 A1* | 1/2021 | Yashiro ................ B60W 50/082 |
| 2021/0049901 A1* | 2/2021 | Young ..................... H04W 4/46 |
| 2021/0063200 A1 | 3/2021 | Kroepfl et al. |
| 2021/0248399 A1 | 8/2021 | Martin et al. |
| 2021/0253128 A1 | 8/2021 | Nister et al. |
| 2021/0264175 A1 | 8/2021 | Zhang et al. |
| 2021/0300351 A1 | 9/2021 | Kumano et al. |
| 2022/0066444 A1* | 3/2022 | Mimura ............... G06V 20/597 |
| 2022/0105941 A1* | 4/2022 | Solar ............... B60W 30/18163 |
| 2022/0111857 A1* | 4/2022 | Kulkarni ............... B60W 40/04 |
| 2022/0121199 A1 | 4/2022 | Hashimoto |
| 2022/0135079 A1* | 5/2022 | Ito .................... B60W 30/18027 701/23 |
| 2022/0169279 A1* | 6/2022 | Griffin .................. B60W 50/14 |
| 2022/0306142 A1* | 9/2022 | Taniguchi ............ G06V 20/597 |
| 2023/0055919 A1* | 2/2023 | Yoo ........................ B60W 50/14 |
| 2023/0058508 A1* | 2/2023 | Bush ................... B60W 60/005 |

FOREIGN PATENT DOCUMENTS

| | | | | |
|---|---|---|---|---|
| CA | 3 052 234 A1 | 8/2018 | | |
| CA | 3 072 776 A1 | 2/2019 | | |
| CN | 113906271 A | 1/2022 | | |
| DE | 102020126677 A1 | 4/2022 | | |
| EP | 3560785 A1 | 10/2019 | | |
| EP | 3671396 A1 | 6/2020 | | |
| EP | 3882098 A1 * | 9/2021 | ............ B60W 40/06 |
| GB | 2524393 A | 9/2015 | | |
| JP | 2013-544695 A | 12/2013 | | |
| JP | 2017167737 A | 9/2017 | | |
| KR | 10-2020-0133854 A | 12/2020 | | |
| WO | WO-2015197803 A2 * | 12/2015 | ............ B60K 35/00 |
| WO | WO-2016092796 A1 * | 6/2016 | ........... B60K 28/066 |
| WO | 2016113926 A1 | 7/2016 | | |
| WO | WO-2017130482 A1 * | 8/2017 | ............ B60W 30/10 |
| WO | 2020/210127 A1 | 10/2020 | | |
| WO | 2022/090903 A1 | 5/2022 | | |

OTHER PUBLICATIONS

Office Action dated Feb. 2, 2023 issued in U.S. Appl. No. 17/564,957.
Notice of Allowance dated May 27, 2020, which issued during the prosecution of U.S. Appl. No. 16/131,293.
Non-Final Office Action issued Feb. 11, 2022 in U.S. Appl. No. 17/003,367.
Notice of Allowance Issued to U.S. Appl. No. 17/003,367 on Jun. 2, 2022.
Hashimoto, Ryuta, U.S. Appl. No. 16/131,293, filed Sep. 14, 2018.
Hashimoto, Ryuta, U.S. Appl. No. 17/003,367, filed Aug. 26, 2020.
Hashimoto, Ryuta, U.S. Appl. No. 17/564,957, filed Dec. 29, 2021.

\* cited by examiner

AUTONOMOUS DRIVING SYSTEM

INCORPORATION BY REFERENCE

This application is a continuation of U.S. application Ser. No. 17/564,957, filed Dec. 29, 2021, which is a continuation of U.S. application Ser. No. 17/003,367, filed Aug. 26, 2020, now U.S. Pat. No. 11,449,053, issued Sep. 20, 2022, which is a continuation of U.S. application Ser. No. 16/131,293 filed Sep. 14, 2018, now U.S. Pat. No. 10,788,825, issued Sep. 29, 2020, which claims priority from Japanese Patent Application No. 2017-197031 filed on Oct. 10, 2017. The entire disclosures of the prior applications are considered part of the disclosure of the accompanying continuation application, and are hereby incorporated herein by reference in their entirety.

BACKGROUND

1. Technical Field

The present disclosure relates to an autonomous driving system.

2. Description of Related Art

Published Japanese Translation of PCT Application No. 2013-544695 (JP-A-2013-544695) discloses an autonomous driving system. The autonomous driving system detects a zone, such as a lane junction and a construction site zone, where autonomous driving is difficult. When a vehicle approaches such a zone where autonomous driving is difficult, the autonomous driving system requires the driver to control steering, acceleration, and deceleration.

SUMMARY

As exemplified in Published Japanese Translation of PCT Application No. 2013-544695 (JP-A-2013-544695) described above, the autonomous driving system sometimes sends an operation instruction to the driver during autonomous driving. An operation instruction is an instruction that sends a request or a proposal to the driver and that requests the driver to perform a response operation in response to the request or the proposal.

In some circumstances, a plurality of operation instructions may be sent consecutively within a short period of time. However, the amount of information and the number of operations that a human (driver) can process concurrently are limited. Therefore, when a plurality of operation instructions is sent consecutively in a short period of time, the driver feels impatient and uncomfortable. In addition, due to the shortage of time, there is a possibility that the driver cannot perform the response operation accurately. These inhibit the smooth traveling of the vehicle and reduce the reliability of the autonomous driving system.

For use in an autonomous driving system that sends an operation instruction to the driver during autonomous driving, the present disclosure provides a technology that can reduce driver's impatience and discomfort.

An autonomous driving system includes: a Human Machine Interface; and a control device configured to control autonomous driving of a vehicle, present a first operation instruction to a driver of the vehicle during the autonomous driving, the first operation instruction requesting the driver to perform a first response operation performed in response to a first request or a first proposal by presenting the first request or the first proposal to the driver via the Human Machine Interface, and prohibit presenting a second operation instruction different from the first operation instruction to the driver after the first operation instruction is presented and until the first response operation is completed or until a timing at which the first response operation is predicted to be completed, the second operation instruction requesting the driver to perform a second response operation performed in response to a second request or a second proposal by presenting the second request or the second proposal to the driver via the Human Machine Interface.

According to the present disclosure, the sending of the next operation instruction is prohibited until the response operation to an operation instruction is completed or until the time at which at which the response operation is predicted to be completed. Therefore, the amount of information to be processed, and the number of operations to be executed, concurrently by the driver are reduced. As a result, the driver's impatience and anxiety are reduced. In addition, the driver who is given enough time can easily perform the response operation accurately. These allow a vehicle to travel smoothly and increase the reliability of the autonomous driving system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described below with reference to the attached drawings.

Figure 1:
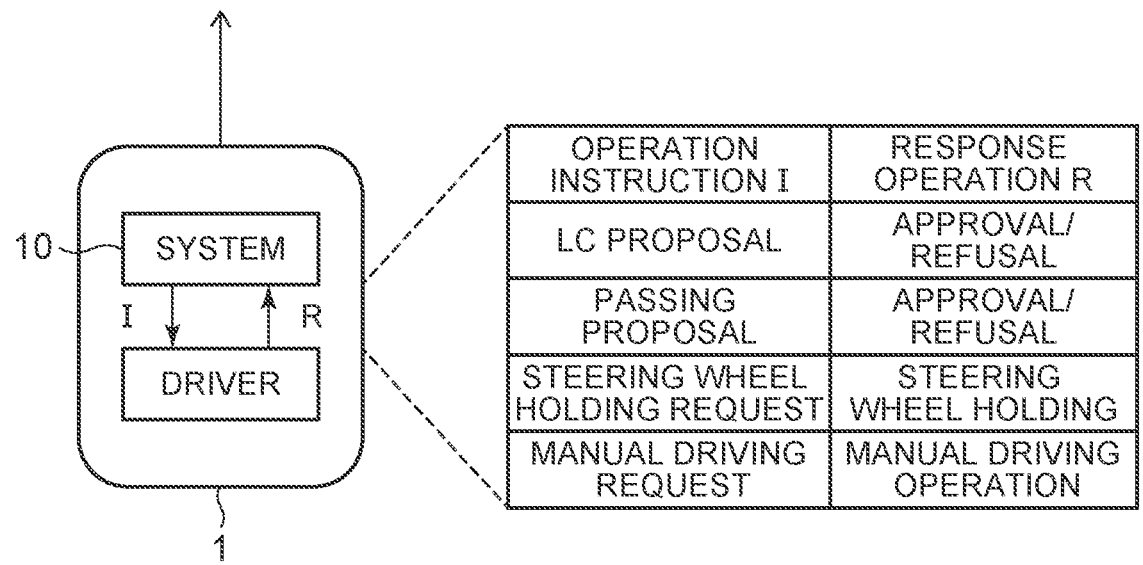
FIG. 1 is a conceptual diagram showing an autonomous driving system according to an embodiment.

FIG. 1 is a conceptual diagram showing an autonomous driving system 10 according to an embodiment. The autonomous driving system 10 is mounted on a vehicle 1 for controlling the autonomous driving of the vehicle 1. For smooth traveling of the vehicle, the autonomous driving system 10 sometimes sends an "operation instruction I" to the driver during autonomous driving. The operation instruction I is an instruction that makes a request or a proposal to the driver and that requests the driver to perform a "response operation R" in response to the request or the proposal.

For example, the autonomous driving system 10 proposes a lane change (LC: Lane Chang) so that the vehicle arrives at the destination. Such a lane change is required, for example, in a situation where there is a lane branch or a lane merge. When a lane change is proposed, the driver is required to approve or refuse the lane change proposal (hereinafter referred to as an "LC proposal"). That is, the "LC proposal" is an operation instruction I, and the response operation R that is performed in response to the LC proposal is an "approval/refusal".

As another example, the autonomous driving system 10 proposes passing a preceding vehicle. Passing can be thought of as one type of the LC proposal. When passing is proposed, the driver is required to approve or refuse the passing proposal. That is, the "passing proposal" is an operation instruction I, and the response operation R that is performed in response to the passing proposal is "approval/refusal".

As yet another example, the autonomous driving system 10 requests the driver to hold the steering wheel. Holding the steering wheel is hereinafter referred to as "steering wheel holding". For example, when there is a sharp curve ahead of the vehicle 1 during autonomous driving, the autonomous driving system 10 requests the driver to hold the steering wheel considering the possibility of lane departure. In response to such a request, the driver holds the steering wheel. That is, the "steering wheel holding request" is an operation instruction I, and the response operation R that is performed in response to the steering holding request is "steering wheel holding".

As yet another example, the autonomous driving system 10 requests the driver to start manual driving. Manual driving is required, for example, in a situation when the vehicle 1 arrives near the destination, when the autonomous driving permitted zone ends, or when there is an event where autonomous driving is not suitable (for example, road work zone, complex terrain). When manual driving is requested, the driver performs the manual driving operation (for example, steering wheel holding, steering operation, accelerator operation, brake operation). That is, the "manual driving request" is an operation instruction I, and the response operation R that is performed in response to the manual driving request is a "manual driving operation".

When the autonomous driving system 10 sends an operation instruction I, the driver is required to understand the contents of the operation instruction I and, in addition, perform the response operation R. However, the amount of information and the number of operations that a human (driver) can process concurrently are limited. Therefore, when a plurality of operation instructions I is sent consecutively in a short period of time, the driver cannot process them and may feel impatient and uncomfortable.

Figure 2:
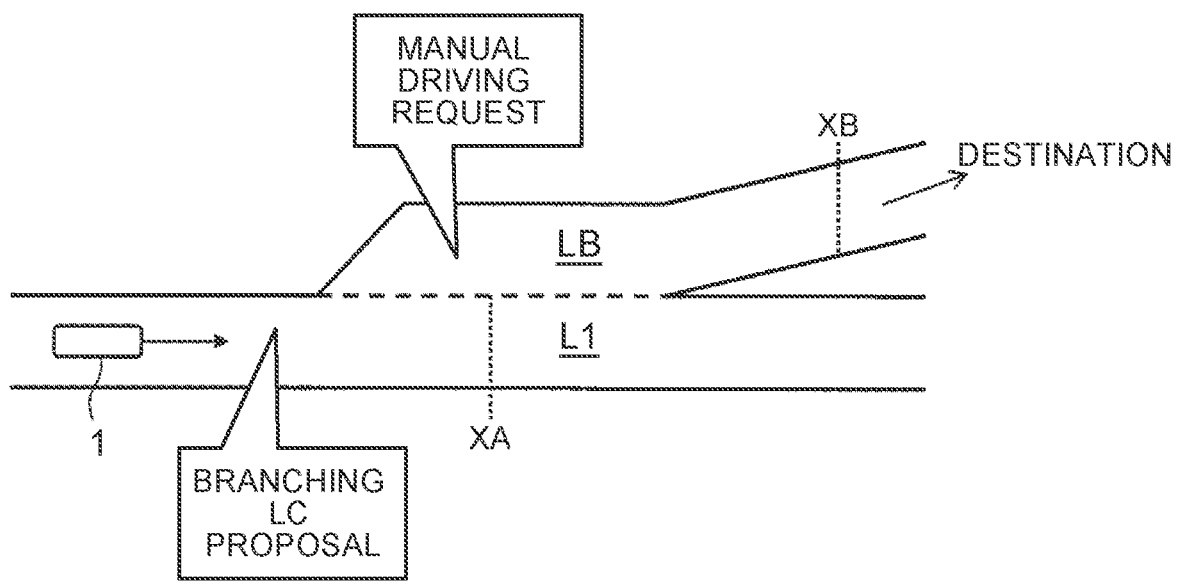
FIG. 2 is a conceptual diagram showing an example of a situation in which a plurality of operation instructions is sent consecutively within a short period of time.

FIG. 2 is a conceptual diagram showing an example of the situation in which a plurality of operation instructions I is consecutively sent in a short period of time. The vehicle 1 is traveling in lane L1, and there is a lane branch ahead of the vehicle 1. To arrive at the destination, the autonomous driving system 10 plans to change the lane from lane L1 to branch lane LB at position XA. In addition, at position XB immediately after entering branch lane LB, manual driving is required. For example, there is a toll booth beyond position XB, or the autonomous driving permitted zone (for example, an express way) ends at a position ahead of position XB. In this case, the autonomous driving system 10 sends the "branching LC proposal" before position XA and sends the "manual driving request" before position XB.

Figure 3:
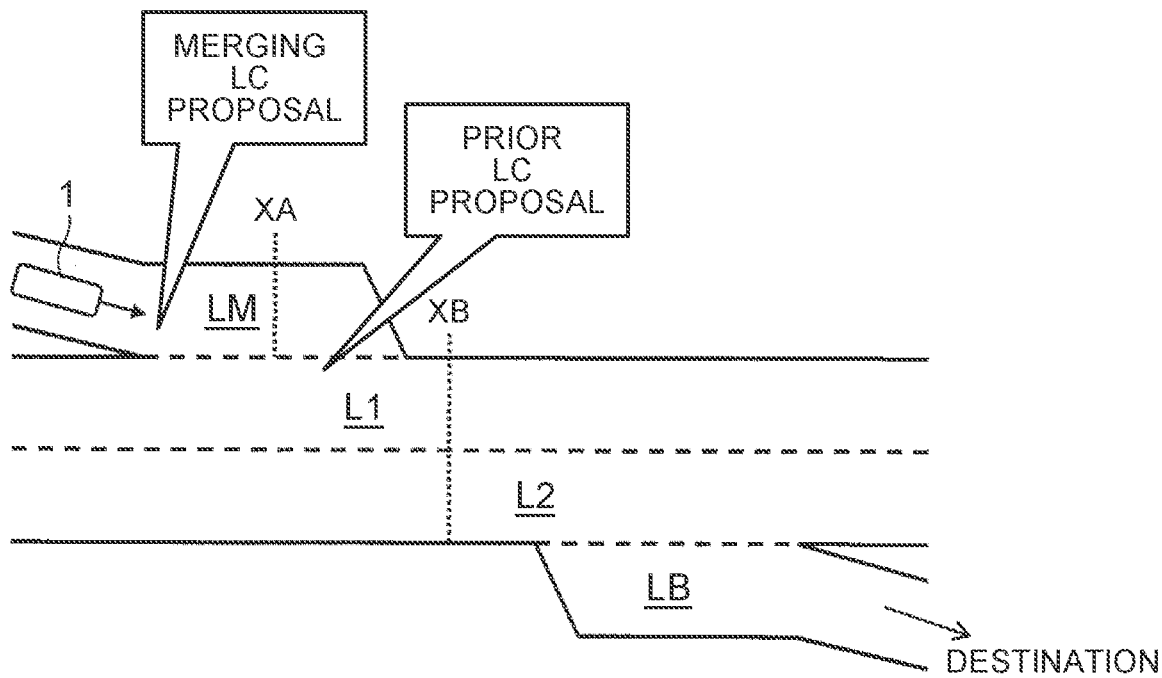
FIG. 3 is a conceptual diagram showing another example of a situation in which a plurality of operation instructions is sent consecutively within a short period of time.

FIG. 3 is a conceptual diagram showing another situation. The vehicle 1 is traveling in a merging lane LM. The merging lane LM merges into lane L1, there is lane L2 adjacent to lane L1 and, in addition, branch lane LB branches from lane L2. In this situation, the autonomous driving system 10 plans to change the lane from the merging lane LM to lane L1 at position XA. In addition, the autonomous driving system 10 plans to enter branch lane LB to arrive at the destination. To enter branch lane LB, it is necessary to change the lane to lane L2 in advance. Therefore, at position XB immediately after entering lane L1, the autonomous driving system 10 plans to change the lane from lane L1 to lane L2 in advance. In this case, the autonomous driving system 10 sends the "merging LC proposal" before position XA, and the "pre-sending LC proposal" before position XB.

Figure 4:
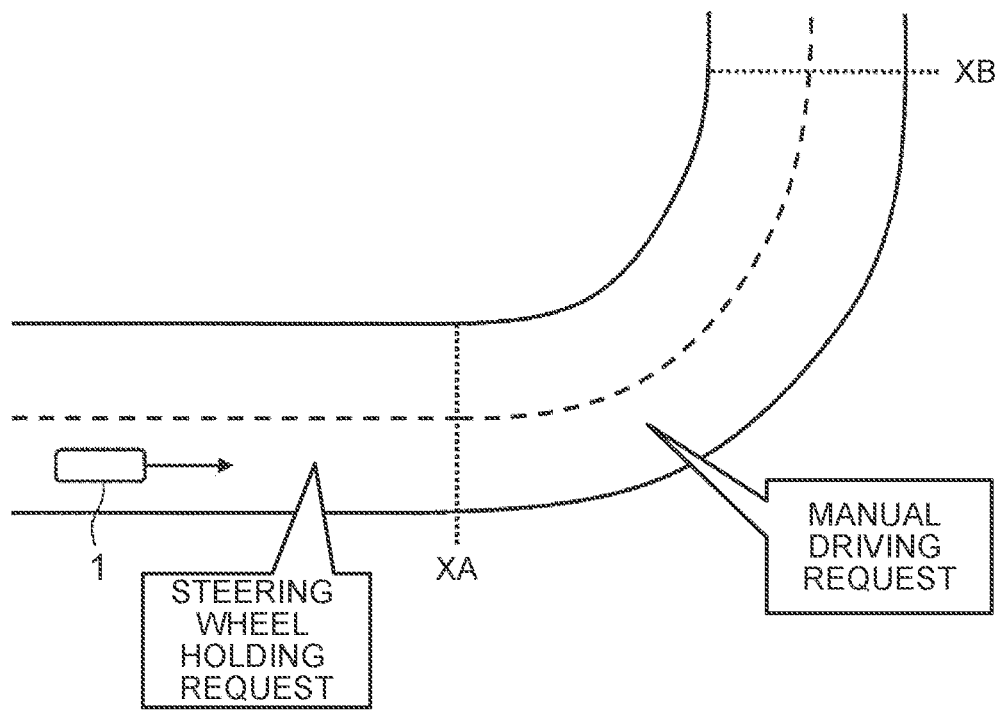
FIG. 4 is a conceptual diagram showing yet another example of a situation in which a plurality of operation instructions is sent consecutively within a short period of time.

FIG. 4 is a conceptual diagram showing still another situation. There is a sharp curve ahead of the vehicle 1. The autonomous driving system 10 requests the driver to hold the steering wheel considering the possibility of lane departure. More specifically, the autonomous driving system 10 sends the "steering wheel holding request" before the position XA where the sharp curve starts. In addition, at position XB ahead of position XA, manual driving is required. For example, there is the destination or a road work zone beyond position XB. In this case, the autonomous driving system 10 sends the "manual driving request" before position XB.

As exemplified above, there are cases where a plurality of operation instructions I is sent consecutively within a short period of time. Since the amount of information and the number of operations that a human (driver) can process concurrently are limited, the driver feels impatient and uncomfortable when a plurality of operation instructions I is sent consecutively in a short period of time. In addition, due to the shortage of time, there is a possibility that the driver cannot perform the response operation R accurately. These inhibit the smooth traveling of the vehicle and reduce the reliability of the autonomous driving system 10.

To solve such a problem, the autonomous driving system 10 according to this embodiment positively adjusts the sending of operation instructions I. More specifically, after an operation instruction I is sent and until the response operation R is completed or until the time comes at which the response operation R is expected to be completed, the autonomous driving system 10 prohibits the sending of the next operation instruction I.

Figure 5:
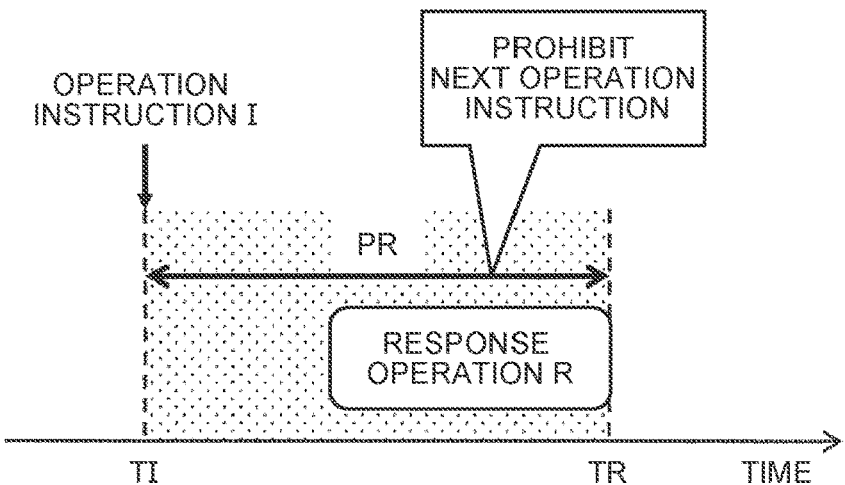
FIG. 5 is a conceptual diagram schematically showing the embodiment.

FIG. 5 is a conceptual diagram schematically showing the embodiment described above. The operation instruction time TI is the time at which an operation instruction I is sent. The response operation completion time TR is the time at which the response operation R that is performed in response to the operation instruction I is completed, or the time at which the response operation R is predicted to be completed. The response operation period PR is a period from the operation instruction time TI to the response operation completion time TR. During this response operation period PR, it is prohibited to send the next operation instruction I to the driver.

According to this embodiment, the sending of the next operation instruction I is prohibited as described above until the response operation R that is performed in response to an operation instruction I is completed, or until the time at which the response operation R is expected to be completed. Therefore, the amount of information to be processed, and the number of operations to be executed, concurrently by the driver are reduced. As a result, the driver's impatience and anxiety are reduced. In addition, the driver who is given enough time can perform the response operation R accurately. These allow a vehicle to travel smoothly and to increase the reliability of the autonomous driving system 10.

The configuration and processing of the autonomous driving system 10 according to this embodiment will be described in more detail.

2. Configuration Example of the Autonomous Driving System

Figure 6:
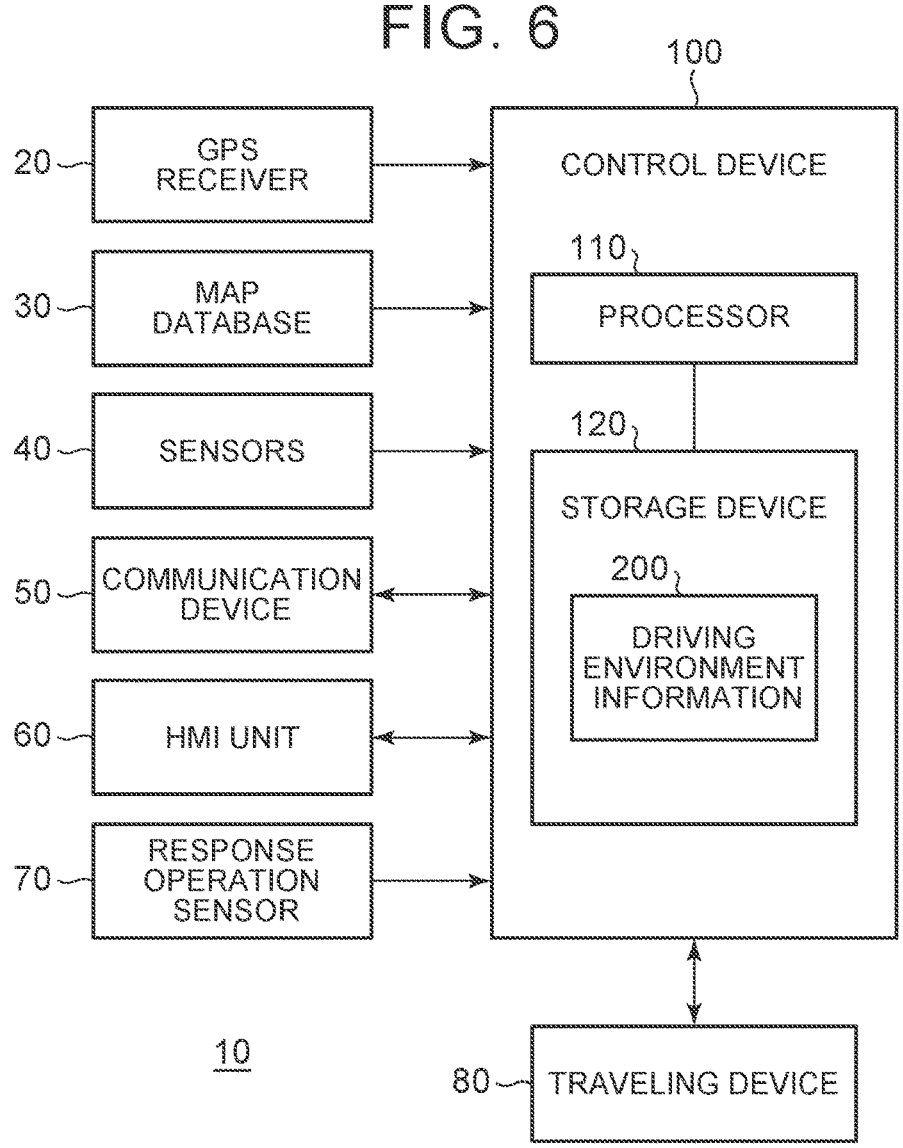
FIG. 6 is a block diagram showing a configuration example of an autonomous driving system according to the embodiment.

FIG. 6 is a block diagram showing a configuration example of the autonomous driving system 10 according to this embodiment. The autonomous driving system 10 includes a Global Positioning System (GPS) receiver 20, a map database 30, sensors 40, a communication device 50, a Human Machine Interface (HMI) unit 60, a response operation sensor 70, a traveling device 80, and a control device 100.

The GPS receiver 20 receives signals sent from a plurality of GPS satellites and calculates the position and orientation of the vehicle 1 based on the received signals.

The map database 30 records map information therein. The map information includes the information on the lane arrangement, lane attribute, autonomous driving permitted zone, location of facilities (for example, a toll booth), and so on.

The sensors 40 detect the surrounding situation of the vehicle 1 and the traveling state of the vehicle 1. Examples of the sensors 40 include Lidar (LIDAR: Laser Imaging Detection and Ranging), a radar, a camera, and a vehicle speed sensor. Lidar uses light to detect a target around the vehicle 1. The radar uses radio waves to detect a target around the vehicle 1. The camera captures the situation around the vehicle 1. The vehicle speed sensor detects the speed of the vehicle 1.

The communication device 50 communicates with the outside of the vehicle 1. For example, the communication device 50 performs V2I communication (road-vehicle communication) with the surrounding infrastructures. The communication device 50 may perform V2V communication (vehicle-to-vehicle communication) with the surrounding vehicles. The communication device 50 can also communicate with the management server that manages the autonomous driving service via a communication network.

The HMI unit 60 is an interface for providing information to the driver and for accepting information from the driver. More specifically, the HMI unit 60 has an input device and an output device. Examples of the input device include a touch panel, a switch, and a microphone. Examples of the output device include a display device and a speaker. The output device is used for notifying an operation instruction I to the driver. The input device is used by the driver to enter the response operation R (in particular approval/refusal).

The response operation R performed by the driver is not limited to "approval/refusal". The response operation R may be "steering wheel holding" or "manual driving request operation" in some cases. The response operation sensor 70 is a sensor for detecting the response operation R other than "approval/refusal". For example, the response operation sensor 70 includes a steering touch sensor for detecting whether the driver is holding the steering wheel. The response operation sensor 70 may also include sensors for detecting the steering operation, the accelerator operation, and the brake operation, respectively.

The traveling device 80 includes a steering device, a driving device, and a braking device. The steering device steers the wheels. The driving device is a power source that generates a driving force. Examples of the driving device include an electric motor and an engine. The braking device generates a braking force.

The control device 100 controls the autonomous driving of the vehicle 1. The control device 100 is a microcomputer including a processor 110 and a storage device 120. The control device 100 is also called an Electronic Control Unit (ECU). The processor 110 executes the control programs, stored in the storage device 120, to cause the control device 100 to perform autonomous driving control.

In more detail, the control device 100 acquires information necessary for autonomous driving control. The information necessary for the autonomous driving control is hereinafter referred to as "driving environment information 200". The driving environment information 200, stored in the storage device 120, is read as necessary.

Figure 7:
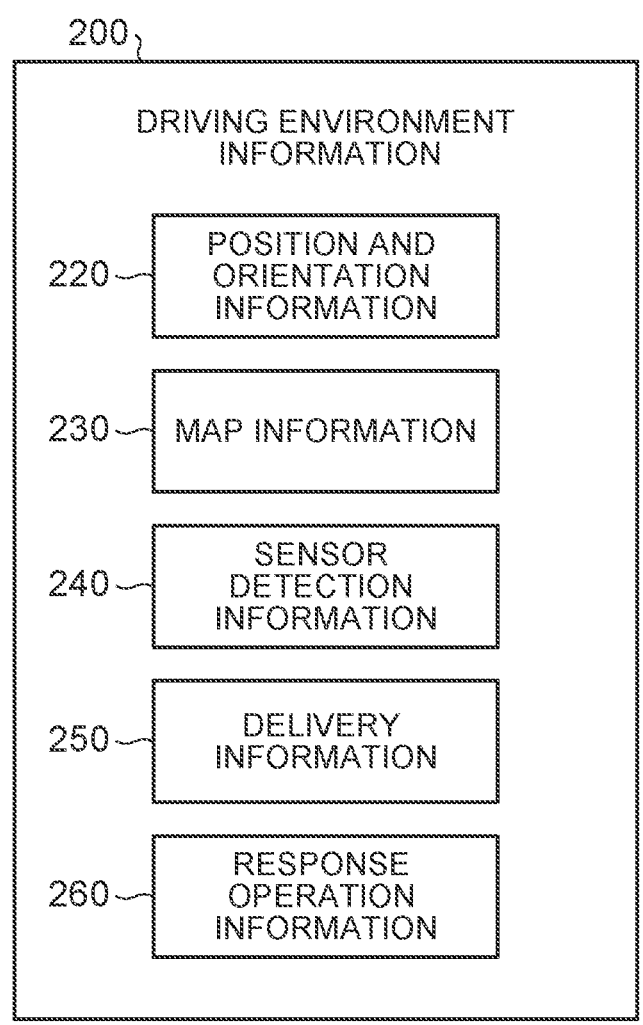
FIG. 7 is a block diagram showing an example of driving environment information used in the autonomous driving system according to the embodiment.

FIG. 7 shows an example of the driving environment information 200 in this embodiment. The driving environment information 200 includes position and orientation information 220, map information 230, sensor detection information 240, delivery information 250, and response operation information 260.

The position and orientation information 220 indicates the position and orientation of the vehicle 1. The control device 100 acquires the position and orientation information 220 from the GPS receiver 20.

The map information 230 includes the information on the lane arrangement, lane attribute, autonomous driving permitted zone, location of facilities (for example, a toll booth), and so on. The control device 100 acquires the map information 230 around the vehicle 1 based on the position and orientation information 220 and the map database 30. The control device 100 can collect information on lane merging, lane branching, intersections, and lane curvatures based on the lane arrangement and the lane attributes indicated by the map information 230.

The sensor detection information 240 is the information obtained from the detection result of the sensors 40. More specifically, the sensor detection information 240 includes the target information on the targets around the vehicle 1. Examples of the targets around the vehicle 1 are surrounding vehicles, pedestrians, roadside objects, white lines, signs, and so on. In addition, the sensor detection information 240 includes the vehicle speed detected by the vehicle speed sensor. The control device 100 acquires the sensor detection information 240 based on the detection result of the sensors 40.

The delivery information 250 is the information obtained through the communication device 50. For example, the delivery information 250 includes the road traffic information (congestion information, road work zone information, accident information, traffic regulation information, etc.) delivered from the infrastructure. The delivery information 250 may include the information delivered from the management server that manages the autonomous driving service. The control device 100 acquires the delivery information 250 by communicating with the outside using the communication device 50.

The response operation information 260 is the information indicating whether the response operation R has been performed by the driver. For example, the control device 100 acquires the response operation information 260 on approval/refusal through the HMI unit 60. The control device 100 also acquires the response operation information 260 on the response operation R other than approval/refusal from the response operation sensor 70.

The control device 100 controls the autonomous driving of the vehicle 1 based on the driving environment information 200 such as the one described above. More specifically, the control device 100 generates a travel plan of the vehicle 1 based on the driving environment information 200. Then, the control device 100 controls the traveling device 80 and causes the vehicle 1 to travel according to the travel plan.

In addition, the control device 100 plans the sending of an operation instruction I as needed during autonomous driving. Then, the control device 100 sends (notifies) the operation instruction I to the driver using the HMI unit 60. The driver performs the response operation R in response to the operation instruction I. The control device 100 confirms that the response operation R has been performed by the driver, based on the response operation information 260. For example, if the operation instruction I is an "LC proposal" and the "LC proposal" is approved by the driver, the control device 100 controls the traveling device 80 to cause the vehicle to change the lane.

According to this embodiment, the control device 100 prohibits the sending the next operation instruction I after an operation instruction I is sent and until the response operation R is completed, or until the response operation R is expected to be completed. The processing performed by the control device 100 to send an operation instruction I is called the "operation instruction sending processing" in the description below. An example of the operation instruction sending processing in this embodiment will be described in detail below.

3. Example of Operation Instruction Sending Processing

Figure 8:
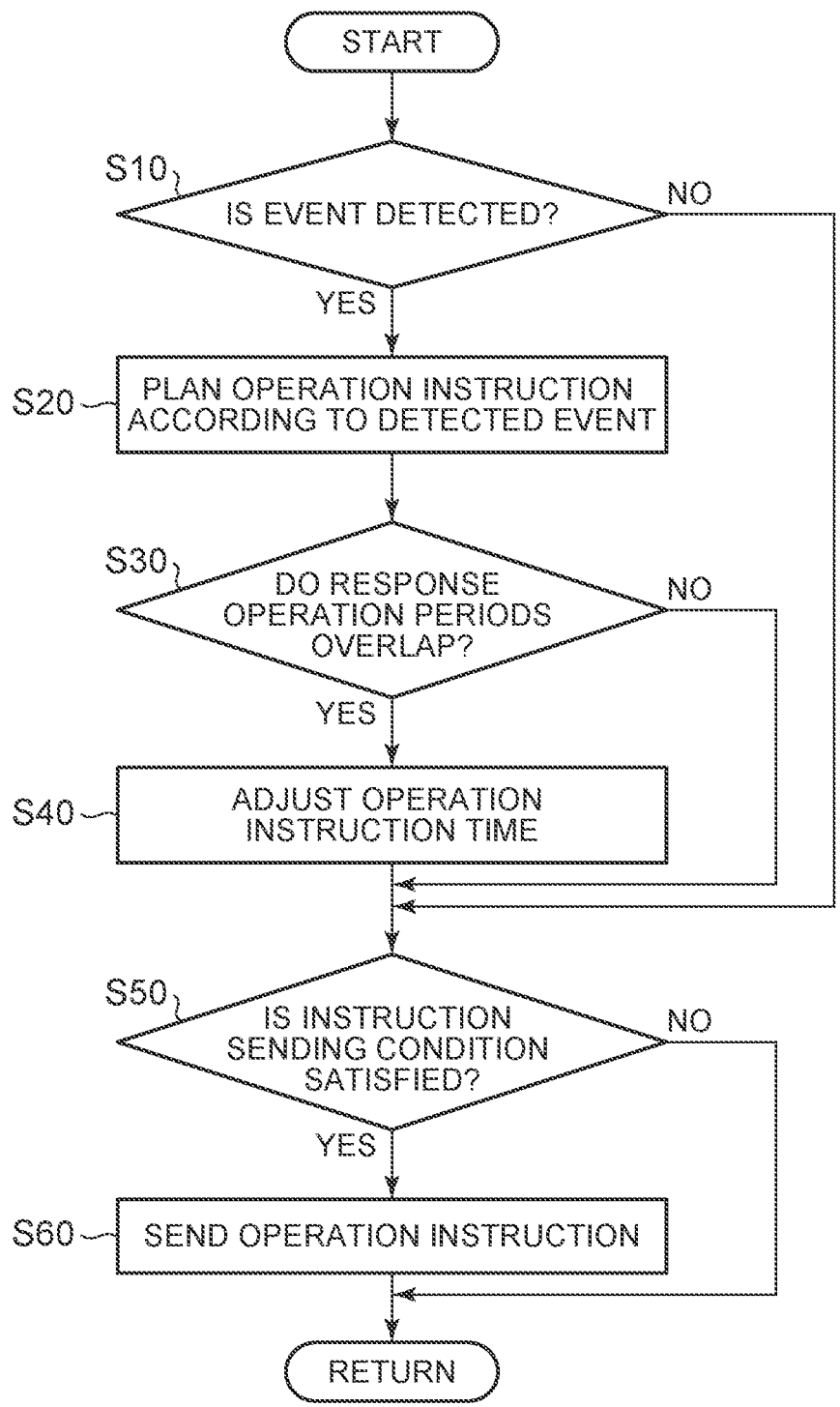
FIG. 8 is a flowchart showing the operation instruction sending processing performed by the autonomous driving system according to the embodiment.

FIG. 8 is a flowchart showing the operation instruction sending processing according to this embodiment. The processing flow shown in FIG. 8 is repeatedly executed for each predetermined cycle.

3-1. Step S10

The control device 100 detects an event related to an operation instruction I based on the driving environment information 200. An event related to an operation instruction I is an event for which the control device 100 plans to send an operation instruction I.

For example, events related to the "LC proposal" are lane branching, lane merging, and so on. These events can be detected based on the map information 230.

As another example, events related to the "passing proposal" are a low-speed preceding vehicles and so on. A low-speed preceding vehicle can be detected based on the sensor detection information 240 (target information and vehicle speed information).

As a still another example, events related to the "steering wheel holding request" are a sharp curve ahead of the vehicle 1 and so on. A sharp curve can be detected based on the map information 230 (lane arrangement information).

As a still another example, events related to the "manual driving request" are a pre-set destination, a toll booth, and the end of an autonomous driving permitted zone, and so on. These events can be detected based on the map information 230. In addition, an event that is difficult to be handled during autonomous driving, such as a road work zone, a traffic congestion zone, and a complex terrain, can be thought of as an event related to the "manual driving request". A road work zone and a traffic congestion zone can be recognized based on the delivery information 250. A complex terrain is recognizable based on the map information 230.

If an event related to an operation instruction I is detected (step S10; Yes), the processing proceeds to step S20. Otherwise (step S10; No), the processing proceeds to step S50.

3-2. Step S20

The control device 100 plans an operation instruction I according to the event detected in step S10. More specifically, the control device 100 determines the type of the operation instruction I according to the detected event and, in addition, plans an operation instruction time TI at which the operation instruction I is to be sent. The operation instruction time TI is earlier than the time at which the vehicle 1 will arrive at the detected event. The control device 100 calculates the time at which the vehicle 1 will arrive at the detected event, based on the position and orientation information 220, the map information 230, and the sensor detection information 240 (vehicle speed information) and, as necessary, plans the operation instruction time TI. After that, the processing proceeds to step S30.

3-3. Step S30

The control device 100 determines whether the response operation period PR (see FIG. 5) for the operation instruction I, planned in step S20, overlaps the response operation period PR for an existing operation instruction I that has already been planned.

Figure 9:
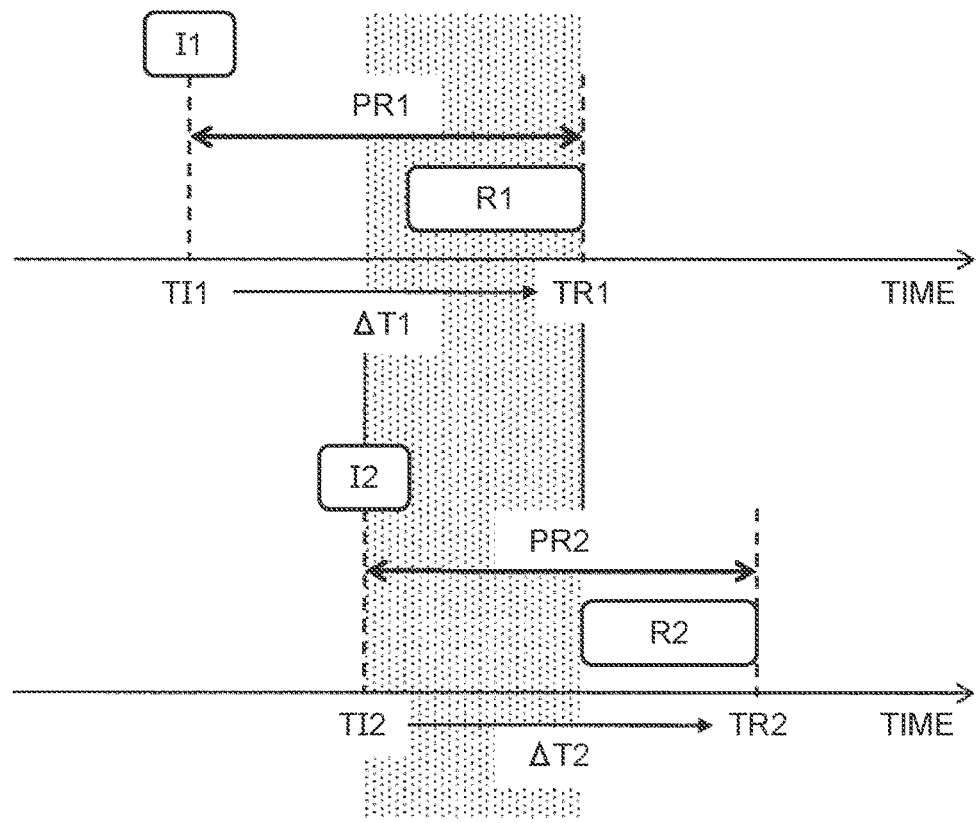
FIG. 9 is a conceptual diagram showing the processing in step S30 in the operation instruction sending processing according to the embodiment.

FIG. 9 is a conceptual diagram showing the processing in step S30. In the description below, consider the case where there are two operation instructions, "first operation instruction I1" and "second operation instruction I2", as the candidate for the operation instruction I.

The first operation instruction time TI1 is the time at which the first operation instruction I1 is sent. The first response operation R1 is the response operation R that is performed in response to the first operation instruction I1. The first response operation completion time TR1, a time later than the first operation instruction time TI1 by the first predicted time ΔT1, is the time at which the first response operation R1 is predicted to be completed. The first response operation period PR1 is a period from the first operation instruction time TI1 to the first response operation completion time TR1.

The second operation instruction time TI2 is the time at which the second operation instruction I2 is sent. The second response operation R2 is the response operation R that is performed in response to the second operation instruction I2. The second response operation completion time TR2, a time later than the second operation instruction time TI2 by the second predicted time $\Delta T2$, is the time at which the second response operation R2 is predicted to be completed. The second response operation period PR2 is a period from the second operation instruction time TI2 to the second response operation completion time TR2.

The predicted time $\Delta T$ from the operation instruction time TI to the response operation completion time TR is predetermined for each type of the operation instruction I. For example, when the operation instruction I is the "LC proposal" or the "passing proposal", the predicted time $\Delta T$ is set to 8 seconds. When the operation instruction I is the "steering wheel holding request", the predicted time $\Delta T$ is set to 6 seconds. When the operation instruction I is the "manual driving request", the predicted time $\Delta T$ is set to 6 seconds. The setting information on the predicted times $\Delta T$ is pre-stored in the storage device 120. The control device 100 can acquire the predicted time $\Delta T$ according to an operation instruction I by referring to the setting information.

The control device 100 predicts the first response operation completion time TR1, that is, the first response operation period PR1, by adding the first predicted time $\Delta T1$ to the first operation instruction time TI1 planned in step S20. Similarly, the control device 100 predicts the second response operation completion time TR2, that is, the second response operation period PR2, by adding the second predicted time $\Delta T2$ to the second operation instruction time TI2 planned in step S20.

Then, the control device 100 determines whether the predicted first response operation period PR1 and the predicted second response operation period PR2 overlap. In the example shown in FIG. 9, the first response operation period PR1 and the second response operation period PR2 overlap. If the first response operation period PR1 and the second response operation period PR2 overlap (step S30; Yes), the processing proceeds to step S40. Otherwise (step S30; No), the processing proceeds to step S50.

3-4. Step S40

The control device 100 adjusts at least one of the first operation instruction time TI1 and the second operation instruction time TI2 so that the first response operation period PR1 and the second response operation period PR2 do not overlap.

If neither the first operation instruction I1 nor the second operation instruction I2 has been sent, it is first necessary to determine which one of the first operation instruction I1 and the second operation instruction I2 is to be sent first. One of the first operation instruction I1 and the second operation instruction I2, whichever is sent first, is hereinafter called a "preceding operation instruction IA" and the other is called a "following operation instruction IB". The control device 100 determines the preceding operation instruction IA, based on the combination of the first operation instruction I1 and the second operation instruction I2. As a method for determining which operation instruction, either first operation instruction I1 or second operation instruction I2, is the preceding operation instruction IA, various examples can be considered as will be described later.

Figure 10:
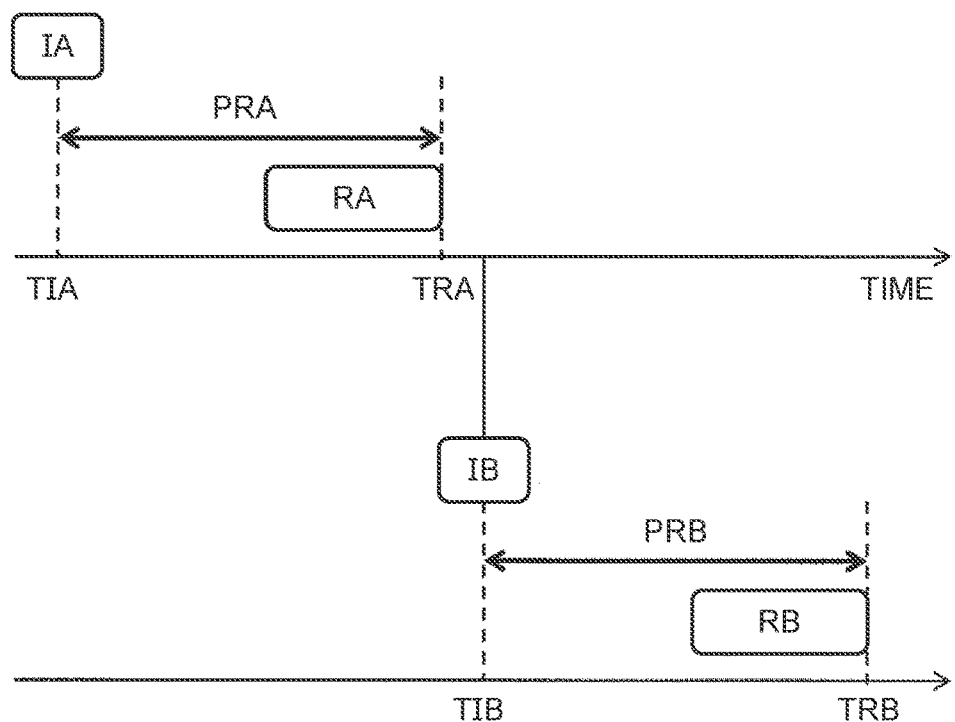
FIG. 10 is a conceptual diagram showing the processing in step S40 in the operation instruction sending processing according to the embodiment.

FIG. 10 is a conceptual diagram showing the processing in step S40. The preceding operation instruction time TIA is the time at which the preceding operation instruction IA is sent. The preceding response operation RA is the response operation R that is performed in response to the preceding operation instruction IA. The preceding response operation completion time TRA is the time at which the preceding response operation RA is predicted to be completed. The preceding response operation period PRA is a period from the preceding operation instruction time TIA to the preceding response operation completion time TRA.

The following operation instruction time TIB is time at which the following operation instruction IB is sent. The following response operation RB is the response operation R that is performed in response to the following operation instruction IB. The following response operation completion time TRB is the time at which the following response operation RB is predicted to be completed. The following response operation period PRB is a period from the following operation instruction time TIB to the following response operation completion time TRB.

The control device 100 adjusts at least one of the preceding operation instruction time TIA and the following operation instruction time TIB so that the preceding response operation period PRA and the following response operation period PRB do not overlap. For example, the control device 100 sets the preceding operation instruction time TIA to a time earlier than the planned time. Alternatively, the control device 100 sets the following operation instruction time TIB to a time later than the planned time.

If the following operation instruction time TIB is too late, there is a possibility that the vehicle 1 will arrive at an event related to the following operation instruction IB before the following operation instruction IB is sent. That is, the following operation instruction IB may be too late (meaningless). In that sense, it is safer to set the preceding operation instruction time TIA to an earlier time rather than to set the following operation instruction time TIB to a later time.

In the situation where one of the first operation instruction I1 and the second operation instruction I2 has already been sent and the control device 100 is waiting for the response operation R, the already sent operation instruction I becomes the preceding operation instruction IA and the other instruction becomes the following operation instruction IB. In such a case, the control device 100 sets the following operation instruction time TIB to a later time so that the preceding response operation period PRA and the following response operation period PRB do not overlap.

After step S40, the processing proceeds to step S50.

3-5. Steps S50 and S60

The control device 100 determines whether the "instruction sending condition" is satisfied (step S50). The instruction sending condition is a condition under which an operation instruction I, planned by the control device 100, is actually sent to the driver. If the instruction sending condition is satisfied (step S50; Yes), the control device 100 sends the operation instruction I to the driver via the HMI unit 60 (step S60). If the instruction sending condition is not satisfied (step S50; No), the current processing cycle ends and the processing returns to step S10.

Typically, the instruction sending condition is the condition that the "operation instruction time TI has come". For example, in the example shown in FIG. 10, when the preceding operation instruction time TIA has come, the control device 100 sends the preceding operation instruction IA. After that, when the following operation instruction time TIB has come, the control device 100 sends the following operation instruction IB.

As another example, the instruction sending condition for the following operation instruction IB may be the condition that the "preceding response operation RA has completed". The control device 100 can confirm the completion of the preceding response operation RA based on the response operation information 260. If the completion of the preceding response operation RA cannot be confirmed when the following operation instruction time TIB has come, the control device 100 sets the following operation instruction time TIB to a later time. Conversely, if the following operation instruction time TIB has not yet come when the completion of the preceding response operation RA can be confirmed, the control device 100 may set the following operation instruction time TIB to an early time. In any case, the control device 100 sends the following operation instruction IB after confirming that the preceding response operation RA has been completed. In this way, by finely adjusting the following operation instruction time TIB through the monitoring of the actual preceding response operation RA, the accuracy is improved than when the following operation instruction time TIB that is based only on the predicted value is used.

4. Various Examples for Determining the Preceding Operation Instruction

In step S40 described above, the control device 100 determines the first operation instruction I1 or the second operation instruction I2, whichever is sent first, as the "preceding operation instruction IA". At this time, the control device 100 determines the preceding operation instruction IA, based on the combination of the first operation instruction I1 and the second operation instruction I2. There are various examples for determining the preceding operation instruction IA.

4-1. First Example

Figure 11:
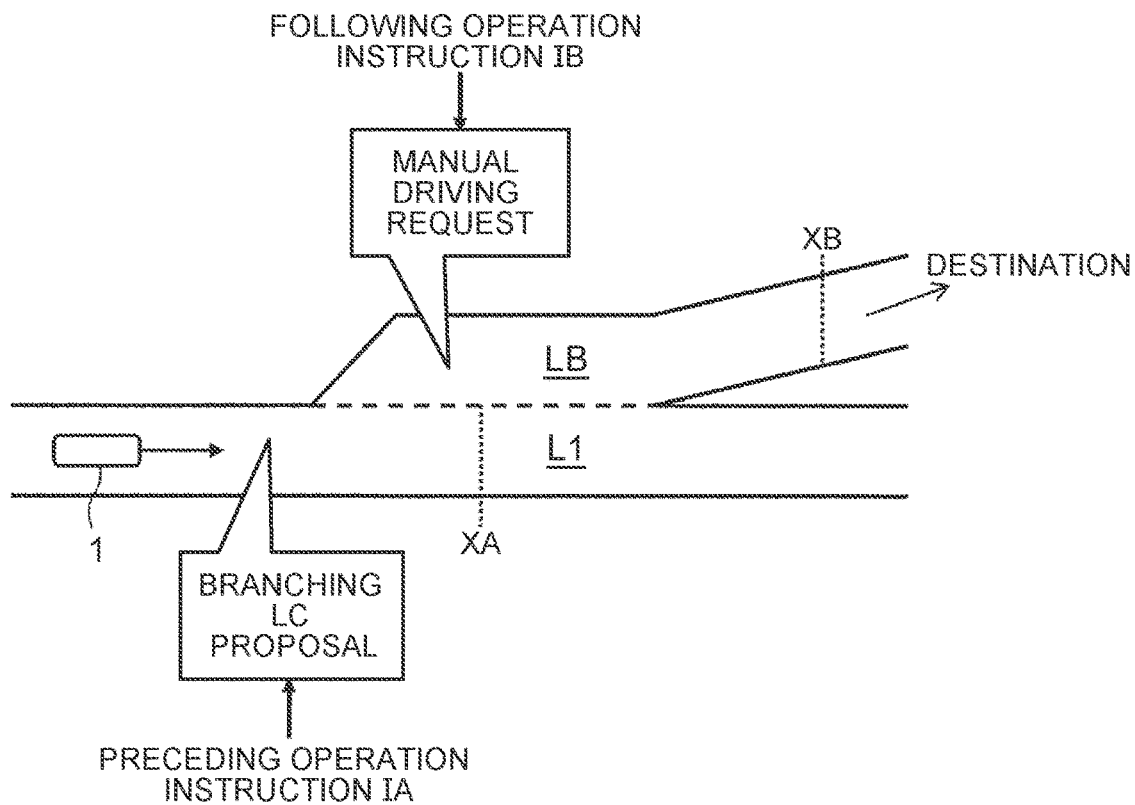
FIG. 11 is a conceptual diagram showing a first example of the determination of a preceding operation instruction in the operation instruction sending processing according to the embodiment.

FIG. 11 is a conceptual diagram showing a first example for determining the preceding operation instruction IA. FIG. 11 shows the same situation as that in FIG. 2 described above. That is, there are two operation instructions I, "branching LC proposal" and "manual driving request", as the candidate for the operation instruction I. The "branching LC proposal" is an operation instruction I related to the event "lane branching". On the other hand, the "manual driving request" is an operation instruction I related to an event in which manual driving is required (example: there is a toll booth ahead of the vehicle, autonomous driving permitted zone is ended). In the situation shown in FIG. 11, the event "lane branching", one of the two events, is nearer to the current position of the vehicle 1. Therefore, the control device 100 determines the "branching LC proposal" as the preceding operation instruction IA.

4-2. Second Example

Figure 12:
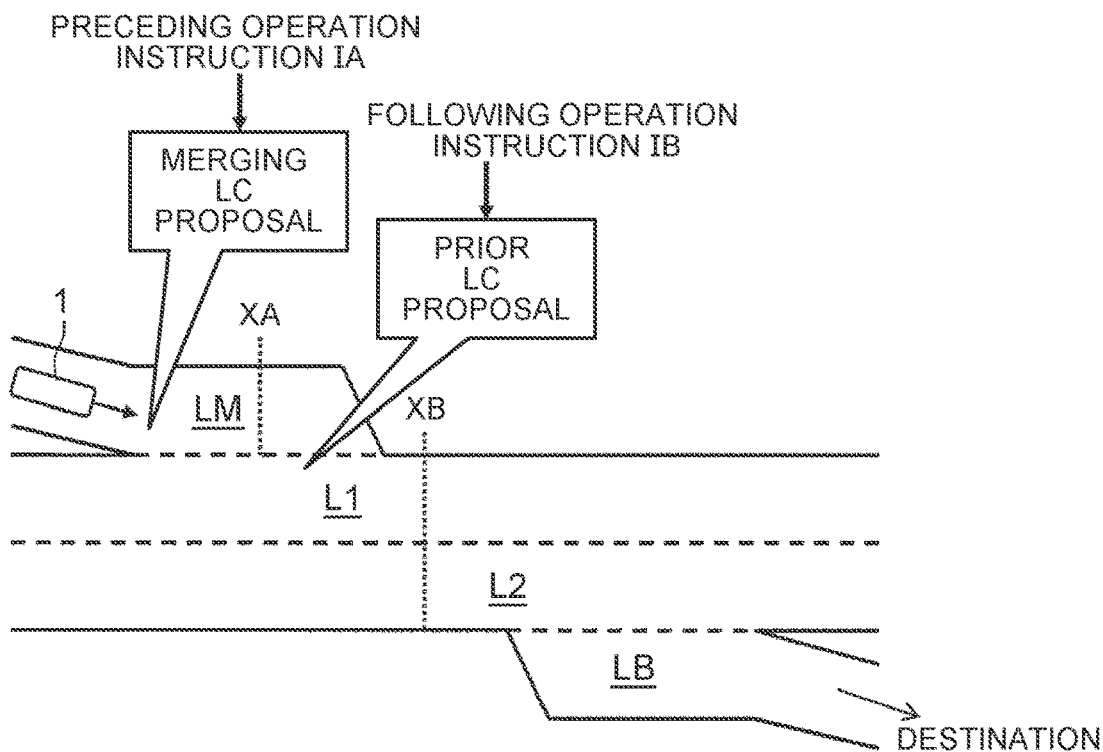
FIG. 12 is a conceptual diagram showing a second example of the determination of a preceding operation instruction in the operation instruction sending processing according to the embodiment.

FIG. 12 is a conceptual diagram showing a second example for determining the preceding operation instruction IA. FIG. 12 shows the same situation as that in FIG. 3 described above. That is, there are two operation instructions I, "merging LC proposal" and "pre-sending LC proposal", as the candidate for the operation instruction I. The "merging LC proposal" is an operation instruction I related to the event "lane merging". On the other hand, the "pre-sending LC proposal" is an operation instruction I related to the event "lane branching". In the situation shown in FIG. 12, the event "lane merging", one of the two events, is nearer to the current position of the vehicle 1. Therefore, the control device 100 determines the "merging LC proposal" as the preceding operation instruction IA.

4-3. Third Example

Figure 13:
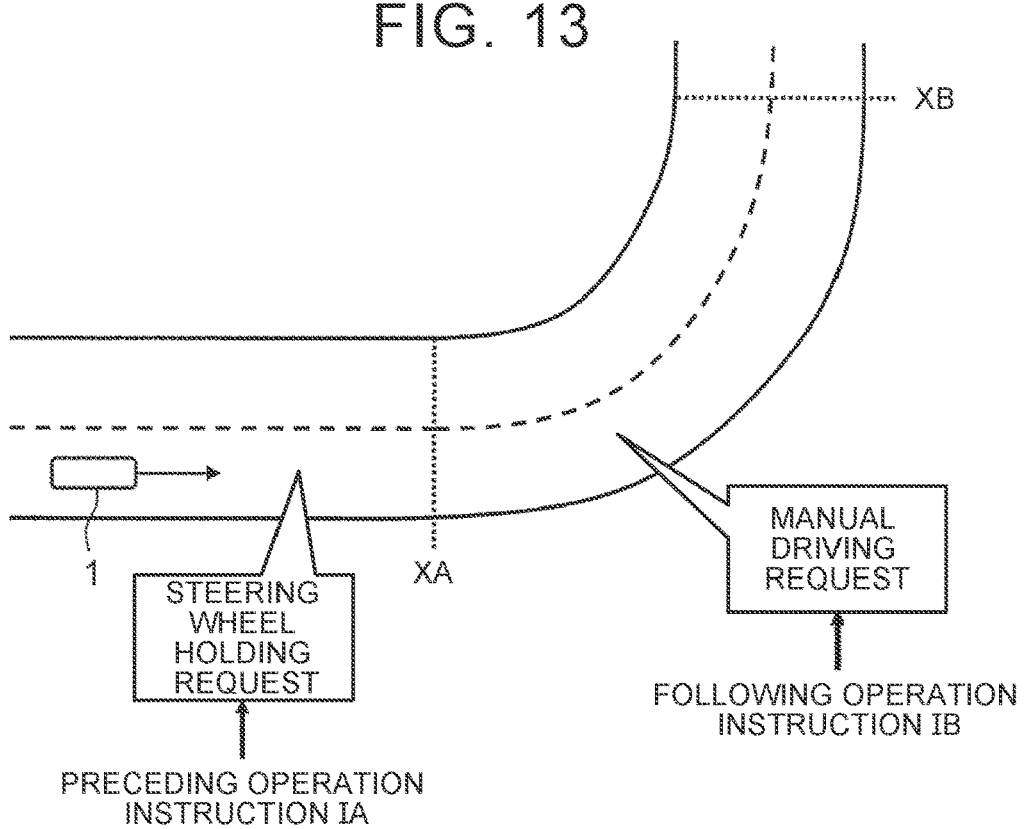
FIG. 13 is a conceptual diagram showing a third example of the determination of a preceding operation instruction in the operation instruction sending processing according to the embodiment.

FIG. 13 is a conceptual diagram showing a third example for determining the preceding operation instruction IA. FIG. 13 shows the same situation as that in FIG. 4 described above. That is, there are two operation instructions I, "steering wheel holding request" and "manual driving request", as the candidate for the operation instruction I. The "steering wheel holding request" is an operation instruction I related to the event "sharp curve". On the other hand, the "manual driving request" is an operation instruction I related to the event in which manual driving is required (for example: the vehicle is approaching the destination or a road work zone). In the situation shown in FIG. 13, the event "sharp curve", one of the two events, is nearer to the current position of the vehicle 1. Therefore, the control device 100 determines the "steering wheel holding request" as the preceding operation instruction IA.

The above first to third examples are generalized as follows. The first operation instruction I1 is related to the first event, and the second operation instruction I2 is related to the second event. One of the first event and the second event, whichever is nearer to the current position of the vehicle 1, is a "preceding event". In this case, the control device 100 determines an operation instruction I that is one of the first operation instruction I1 and the second operation instruction I2 and that is related to the preceding event as the preceding operation instruction IA. Since the operation instructions I are sent in the order in which the events are detected, it is easy for the driver to understand the flow of driving.

4-4. Fourth Example

Figure 14:
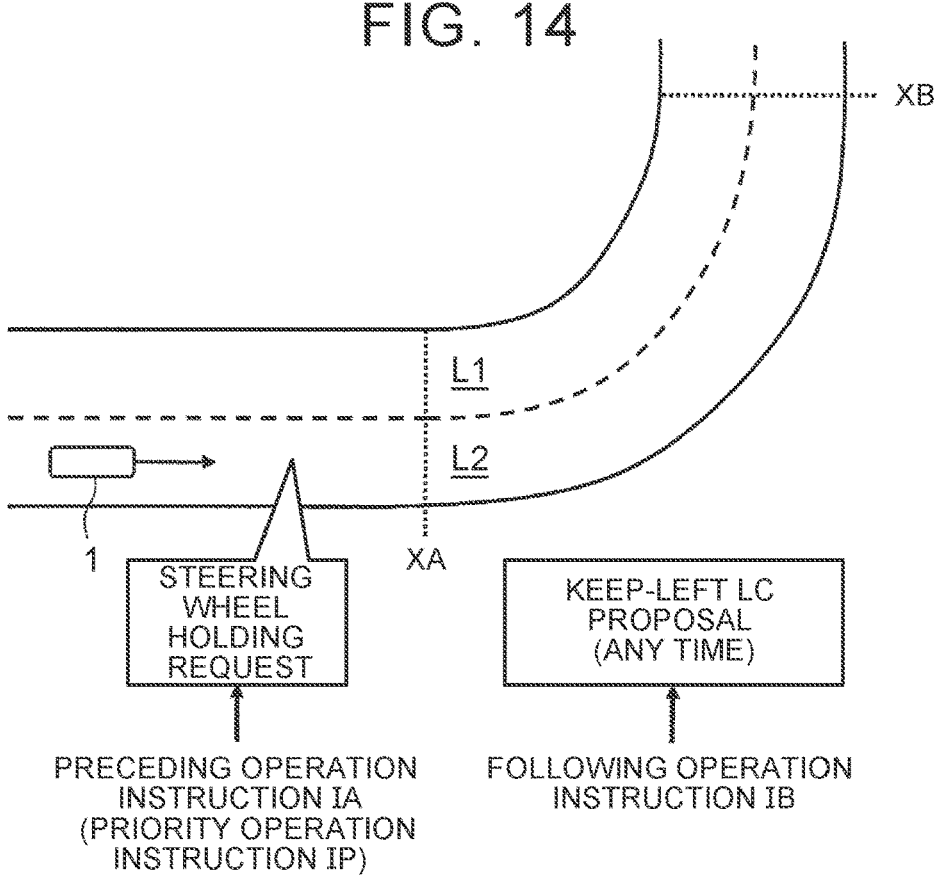
FIG. 14 is a conceptual diagram showing a fourth example of the determination of a preceding operation instruction in the operation instruction sending processing according to the embodiment.

FIG. 14 is a conceptual diagram showing a fourth example for determining the preceding operation instruction IA. The vehicle 1 is traveling in the right side lane L2. The control device 100 plans to send a "keep-left LC proposal" that proposes to change the lane to the left lane L1 to keep to the left. In addition, since there is a sharp curve ahead of the vehicle 1, the control device 100 plans to send the "steering wheel holding request" before position XA where the sharp curve starts.

In this situation, the lane change for keeping to the left, which is not so urgent, may be performed at any time (for example, at position XB after the sharp curve ends). That is, even if the lane change for keeping to the left is delayed to some extent, there is no particular effect on vehicle traveling. On the other hand, from the viewpoint of vehicle traveling, it is desired to complete "steering wheel holding" before position XA where the sharp curve starts. That is, the priority (importance) of "steering wheel holding" is high, whereas the priority of lane change for keeping to the left is not so high and its degree of freedom is high. Therefore, the control device 100 determines the "steering wheel holding request"

as the preceding operation instruction IA, and the "keep-left LC proposal" as the following operation instruction IB.

The fourth example is generalized as follows. An operation instruction I that requires that the response operation R be performed before the vehicle 1 arrives at a specific point is hereinafter referred to as a "priority operation instruction IP". Examples of priority operation instructions IP include not only the "steering wheel holding request" described above but also the "manual driving request", "branching LC proposal", and "merging LC proposal". From the viewpoint of vehicle traveling, safety, and the arrival at the destination, the priority of the priority operation instruction IP is high. On the other hand, the above-mentioned "keep-left LC proposal" and "passing proposal" are not a priority operation instruction IP and have a higher degree of freedom. If one of the first operation instruction I1 and the second operation instruction I2 is a priority operation instruction IP and the other is not, the control device 100 determines the priority operation instruction IP as the preceding operation instruction IA. This makes it possible to reduce the amount of information to be processed, and the number of operations to be executed, by the driver concurrently while at the same time sending a high-priority operation instruction I without delay.

4-5. Fifth Example

Figure 15:
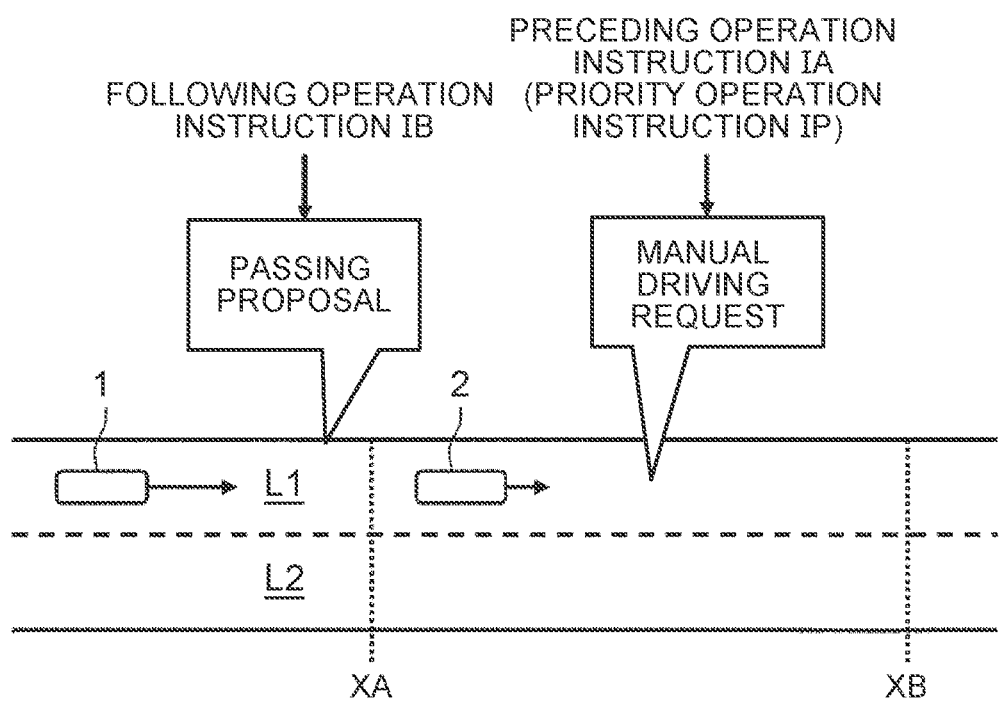
FIG. 15 is a conceptual diagram showing a fifth example of the determination of a preceding operation instruction in the operation instruction sending processing according to the embodiment.

FIG. 15 is a conceptual diagram showing a fifth example for determining the preceding operation instruction IA. The fifth example also relates to the priority operation instruction IP.

The vehicle 1 is traveling in lane L1. In the same lane L1 and ahead of the vehicle 1, there is a low-speed preceding vehicle 2. The control device 100 detects the low-speed preceding vehicle 2 based on the sensor detection information 240. Then, the control device 100 plans to start the passing operation at position XA and plans to send the "passing proposal" before position XA. In addition, at position XB beyond position XA, manual driving is required. For example, there is the destination or a road work zone beyond position XB. Therefore, the control device 100 plans to send the "manual driving request" before position XB.

The manual driving request is a priority operation instruction IP, and the passing proposal is not. Therefore, the control device 100 determines the manual driving request as the preceding operation instruction IA, and the passing proposal as the following operation instruction IB. This makes it possible to send a high priority manual driving request without delay.

When the driver starts manual driving in response to a manual driving request, the result is that the "passing proposal" is not sent from the autonomous driving system 10 (control device 100). Even in this case, the next operation instruction is prohibited until the response operation R, which is performed in response to the operation instruction I, is completed. That is, this makes it possible to reduce the amount of information to be processed, and the number of operations to be executed, by the driver concurrently and, as a result, reduces the driver's impatience and anxiety.

4-6. Sixth Example

As described above, if one of the first operation instruction I1 and the second operation instruction I2 is a priority operation instruction IP and the other is not, the control device 100 determines the priority operation instruction IP as the preceding operation instruction IA. At this time, the control device 100 may discard the operation instruction that is not a priority operation instruction IP. Even in this case, the next operation instruction is prohibited until the response operation R, which is performed in response to the operation instruction I, is completed. That is, this makes it possible to reduce the amount of information to be processed, and the number of operations to be executed, by the driver concurrently and, as a result, reduces the driver's impatience and anxiety.

What is claimed is:

1. A vehicle comprising:
a traveling device; and
a processor configured to:
control autonomous driving of the vehicle by controlling the traveling device;
plan a first operation instruction timing and a second operation instruction timing, the first operation instruction timing being a timing at which a first operation instruction is to be output during the autonomous driving, the second operation instruction timing being a timing at which a second operation instruction is to be output during the autonomous driving, the first operation instruction requesting a driver of the vehicle to perform a first response operation, the second operation instruction requesting the driver to perform a second response operation different from the first response operation;
determine which of the first operation instruction and the second operation instruction is to be output first as a preceding operation instruction;
adjust at least one of the first operation instruction timing and the second operation instruction timing such that a preceding operation instruction timing at which the preceding operation instruction is to be output becomes earlier than a timing at which a non-preceding operation instruction is to be output, the non-preceding operation instruction being an instruction that is not preceding operation instruction among the first operation instruction and the second operation instruction; and
after the adjustment, output the first operation instruction and the second operation instruction to the driver via a Human Machine Interface, at the first operation instruction timing and the second operation instruction timing, respectively.

2. The vehicle according to claim 1, wherein
the first operation instruction is an operation instruction related to a first event and the second operation instruction is an operation instruction related to a second event, and
the processor is configured to:
determine which of the first event and the second event exists closer to a current position of the vehicle as a preceding event, and
determine an operation instruction related to the preceding event, as the preceding operation instruction, among the first operation instruction and the second operation instruction.

3. The vehicle according to claim 1, wherein
the processor is further configured to set a priority operation instruction as the preceding operation instruction when one of the first operation instruction and the second operation instruction is the priority operation instruction and the other is not the priority operation instruction, the priority operation instruction being an operation instruction in response to which a response operation needs to be performed before the vehicle arrives at a particular position.

4. The vehicle according to claim 1, wherein the processor is further configured to output the non-preceding operation instruction to the driver, via the Human Machine Interface, after the processor confirms that a preceding response operation in response to the preceding operation instruction is completed.

5. The vehicle according to claim 1, wherein the processor is further configured to:
predict a first response operation period and a second response operation period based on the first operation instruction timing and the second operation instruction timing, the first response operation period being a period from the first operation instruction timing to a first response operation completion timing at which the first response operation is predicted to be completed, the second response operation period being a period from the second operation instruction timing to a second response operation completion timing at which the second response operation is predicted to be completed; and
adjust at least one of the first operation instruction timing and the second operation instruction timing such that the first response operation period and the second response operation period do not overlap, when the first response operation period and the second response operation period are predicted to overlap.

6. A method that controls autonomous driving of a vehicle by controlling a traveling device of the vehicle, the autonomous driving method comprising:
planning a first operation instruction timing and a second operation instruction timing, the first operation instruction timing being a timing at which a first operation instruction is to be output during the autonomous driving, the second operation instruction timing being a timing at which a second operation instruction is to be output during the autonomous driving, the first operation instruction requesting a driver of the vehicle to perform a first response operation, the second operation instruction requesting the driver to perform a second response operation different from the first response operation;
determine which of the first operation instruction and the second operation instruction is to be output first as a preceding operation instruction;
adjusting at least one of the first operation instruction timing and the second operation instruction timing such that a preceding operation instruction timing at which the preceding operation instruction is to be output becomes earlier than a timing at which a non-preceding operation instruction is to be output, the non-preceding operation instruction being an instruction that is not preceding operation instruction among the first operation instruction and the second operation instruction; and
after the adjustment, outputting the first operation instruction and the second operation instruction to the driver via a Human Machine Interface, at the first operation instruction timing and the second operation instruction timing, respectively.

7. The method according to claim 6, wherein the first operation instruction is an operation instruction related to a first event and the second operation instruction is an operation instruction related to a second event, further comprising:

determining which of the first event and the second event whichever exists closer to a current position of the vehicle as a preceding event, and
determining an operation instruction related to the preceding event, as the preceding operation instruction, among the first operation instruction and the second operation instruction.

8. The method according to claim 6, further comprising:
setting a priority operation instruction as the preceding operation instruction when one of the first operation instruction and the second operation instruction is the priority operation instruction and the other is not the priority operation instruction, the priority operation instruction being an operation instruction in response to which a response operation needs to be performed before the vehicle arrives at a particular position.

9. The method according to claim 6, further comprising:
after confirming that a preceding response operation in response to the preceding operation instruction is completed, output the non-preceding operation instruction to the driver via the Human Machine Interface.

10. The method according to claim 6, further comprising:
predicting a first response operation period and a second response operation period based on the first operation instruction timing and the second operation instruction timing, the first response operation period being a period from the first operation instruction timing to a first response operation completion timing at which the first response operation is predicted to be completed, the second response operation period being a period from the second operation instruction timing to a second response operation completion timing at which the second response operation is predicted to be completed; and
adjusting at least one of the first operation instruction timing and the second operation instruction timing such that the first response operation period and the second response operation period do not overlap, when the first response operation period and the second response operation period are predicted to overlap.

11. A non-transitory computer-readable medium storing a program that, when executed by a processor:
controls a traveling device of a vehicle to control autonomous driving of the vehicle;
plans a first operation instruction timing and a second operation instruction timing, the first operation instruction timing being a timing at which a first operation instruction is to be output during the autonomous driving, the second operation instruction timing being a timing at which a second operation instruction is to be output during the autonomous driving, the first operation instruction requesting a driver of the vehicle to perform a first response operation, the second operation instruction requesting the driver to perform a second response operation different from the first response operation;
determine which of the first operation instruction and the second operation instruction is to be output first as a preceding operation instruction;
adjusts at least one of the first operation instruction timing and the second operation instruction timing such that a preceding operation instruction timing at which the preceding operation instruction is to be output becomes earlier than a timing at which a non-preceding operation instruction is to be output, the non-preceding operation instruction being an instruction that is not preceding operation instruction among the first operation instruction and the second operation instruction; and after the adjustment, outputs the first operation instruction and the second operation instruction to the driver via a Human Machine Interface, at the first operation instruction timing and the second operation instruction timing, respectively.

12. The non-transitory computer-readable medium according to claim 11, wherein the first operation instruction is an operation instruction related to a first event and the second operation instruction is an operation instruction related to a second event, and wherein the program when executed by the processor:

determines which of the first event and the second event exists closer to a current position of the vehicle as a preceding event, and determines an operation instruction related to the preceding event, as the preceding operation instruction, among the first operation instruction and the second operation instruction.

13. The non-transitory computer-readable medium according to claim 11, wherein the program, when executed by the processor, sets a priority operation instruction as the preceding operation instruction when one of the first operation instruction and the second operation instruction is the priority operation instruction and the other is not the priority operation instruction, the priority operation instruction being an operation instruction in response to which a response operation needs to be performed before the vehicle arrives at a particular position.

14. The non-transitory computer-readable medium according to claim 11, wherein the program, when executed by the processor, output the non-preceding operation instruction to the driver, via the Human Machine Interface, after the processor confirms that a preceding response operation in response to the preceding operation instruction is completed.

15. The non-transitory computer-readable medium according to claim 11, wherein the program when executed by the processor:

predicts a first response operation period and a second response operation period based on the first operation instruction timing and the second operation instruction timing, the first response operation period being a period from the first operation instruction timing to a first response operation completion timing at which the first response operation is predicted to be completed, the second response operation period being a period from the second operation instruction timing to a second response operation completion timing at which the second response operation is predicted to be completed; and adjusts at least one of the first operation instruction timing and the second operation instruction timing such that the first response operation period and the second response operation period do not overlap, when the first response operation period and the second response operation period are predicted to overlap.

* * * * *